United States Patent Office 2,694,090
Patented Nov. 9, 1954

2,694,090

2:4:4-TRIMETHYLPENTANAL

Anthony Musgrave Wild, Cheam, Edward James Gasson, Banstead, and Alfred Frank Millidge, Coulsdon, England, assignors to The Distillers Company Limited, Edinburgh, Scotland, a British company No Drawing. Application November 22, 1950, Serial No. 197,168

Claims priority, application Great Britain December 3, 1949

8 Claims. (Cl. 260—601)

In the co-pending U. S. A. patent application Ser. No. 183,651, dated September 7, 1950, of Edward James Gasson and Alfred Frank Millidge, who are co-applicants of the present application, there is described a process for the isomerisation of 1:2-epoxy-2:4:4-trimethyl-pentane by means of acids such as sulphuric acid, phosphoric acid and toluene sulphonic acid and the production thereby of 2:4:4-trimethyl-pentanal.

The present invention refers to a modification of the isomerisation process described therein whereby isomerisation is effected by means of other acidic substances.

It has been found that the isomerisation of 1:2-epoxy-2:4:4-trimethylpentane (hereinafter also referred to as "alpha-di-isobutene epoxide" or "epoxide") can be carried out successfully by using as acidic substances halides such as the chlorides of trivalent iron, zinc, tin, aluminium and titanium, whereby good yields of the desired trimethylpentanal are obtained. Furthermore, boron trifluoride, acid activated siliceous earths such as fuller's earth, bentonite, montmorillonite and activated hydrogen-ion exchange materials such as acid reacting zeolites, sulphonated formaldehyde-phenol resins or sulphonated coal may be used.

The isomerisation reaction may be carried out with the epoxide in its concentrated form or, preferably, with solutions of the epoxide in inert solvents such as hydrocarbons, for instance, paraffins, olefines or aromatic hydrocarbons. Halogenated hydrocarbons such as chloroform and carbon tetrachloride may also be used as solvent. When acidic substances of the kind described above are used according to this invention, the reaction is preferably carried out in the absence of water.

The isomerisation reaction is advantageously effected with the exclusion of air, for instance by working in an inert atmosphere e. g. under nitrogen or carbon dioxide to avoid oxidation of the aldehyde formed.

The temperature at which the reaction of the present invention is most conveniently carried out is in general slightly higher than that usefully employed with strong acids. Temperatures between 50 and 80° C. are sometimes necessary to finish the reaction, but in some instances the greater part of the reaction proceeds smoothly at room temperature. The process of the invention may be carried out batchwise or in a continuous manner.

The following examples illustrate the manner in which the process of the invention may be carried out in practice:

Example 1

50 grams of distilled alpha-di-isobutene epoxide dissolved in 250 cc. of cyclohexane were stirred in an atmosphere of nitrogen or carbon dioxide with 5 grams of powdered anhydrous ferric chloride. After heating under reflux at 80° C. for 15 minutes the mixture was cooled and distilled. After removal of the solvent, 2:4:4-trimethylpentanal with a boiling point of 62.5° C./50 mm. was obtained in 91% yield calculated on the epoxide used.

Example 2

A solution of epoxide in benzene containing 25 cc. of epoxide in 100 cc. was treated with anhydrous ferric chloride as described in Example 1. The yield of aldehyde after reaction at 70° C. for 15 minutes was 88%. More dilute epoxide solutions treated under the same conditions gave the same yield.

Example 3

A solution containing 25 cc. of epoxide in 75 cc. of cyclohexane was stirred with 2.5 grams of powdered anhydrous zinc chloride at 30° C. for 30 minutes under nitrogen. The yield of aldehyde was 72% and was unchanged when the reaction was carried out at 70° C. for 15 minutes. By the use of benzene as solvent under similar conditions, the yields were 82% at 20° C. and 84% at 70° C. When di-isobutylene was used as solvent the reaction proceeded somewhat slower at 20° C. but was complete when the mixture was heated to 70° C. for 15 minutes giving an 88% yield calculated on the epoxide.

Example 4

100 cc. of a 25% epoxide solution in cyclohexane was stirred with 2.5 grams stannic chloride at room temperature under nitrogen. A vigorous reaction occurred and the temperature was allowed to rise to 50° C. After removal of the catalyst and the solvent the product gave a 75% yield of aldehyde.

Example 5

A 25% epoxide solution in cyclohexane was treated as in Example 4 with boron trifluoride-ether complex at room temperature. A 55% yield of aldehyde was obtained.

Example 6

Epoxide treated as described in Example 4 with 2.5 grams of titanium tetrachloride gave, after 30 minutes, a 66% yield of aldehyde.

Example 7

Epoxide in cyclohexane solution as described in Example 1 was treated with 5 grams of acid-washed fuller's earth (Fullmont 700) and gave a yield of 58% aldehyde after 30 minutes' reaction at 70° C.

Example 8

25 cc. epoxide containing 93% of alpha-isomer was stirred for 15 minutes at room temperature with 0.5 gram of anhydrous ferric chloride. After that time it was heated at 70° C. for 15 minutes; the yield of aldehyde obtained amounted to 41%.

Undiluted epoxide treated under the same conditions with zinc chloride gave a 25% yield.

Example 9

25 cc. of an epoxide solution in cyclohexane containing 25 cc. of epoxide in 100 cc. was treated with 0.5 gram stannic bromide at room temperature for 15 minutes. The yield obtained was 76%.

After heating for a further 15 minutes at 70° C. the yield increased to 78%.

Example 10

A solution of 25 cc. of distilled alpha-di-isobutene epoxide in 75 cc. of cyclohexane was stirred in an atmosphere free from oxygen and treated with aluminium chloride (5% calculated on the epoxide). The temperature rose to 50° C., and was maintained at this temperature for five minutes. After cooling, removal of catalyst with water, and distilling, a 30.7% yield of aldehyde was obtained.

We claim

1. Process for the manufacture of 2:4:4-trimethylpentanal which comprises treating 1:2-epoxy-2:4:4-trimethylpentane in the liquid phase at a temperature of about 20 to about 80° C., with an acidic substance selected from the group consisting of the halogenide of trivalent iron, tin, aluminium, zinc and titanium, boron trifluoride and acid treated mineral earth and an acid activated hydrogen ion exchange material.

2. Process as claimed in claim 1 wherein the epoxide is treated in solution in an inert organic solvent.

3. Process as claimed in claim 1 wherein the treatment is carried out in the absence of water.

4. Process as claimed in claim 1 wherein the treatment is carried out in an inert atmosphere.

5. Process as claimed in claim 1 wherein the acidic-substance is a halogenide of a metal selected from the group consisting of trivalent iron, tin, aluminium, zinc and titanium.

6. Process as claimed in claim 1 wherein the acidic substance is boron trifluoride.

7. Process as claimed in claim 1 wherein the acidic substance is an acid treated mineral earth.

8. Process as claimed in claim 1 wherein the acidic substance is an acid activated hydrogen ion exchange material.

References Cited in the file of this patent

UNITED STATES PATENTS

| Number | Name | Date |
|---|---|---|
| 2,031,200 | Baur | Feb. 18, 1936 |
| 2,159,507 | Law et al. | May 23, 1939 |

OTHER REFERENCES

Hickinbottom: Jour. Chem. Soc. (British), 1948 volume, pp. 1331–1333.